March 7, 1939.  J. E. TALBOTT  2,149,875
CABLE SUPPORT
Filed Feb. 1, 1936   3 Sheets-Sheet 1
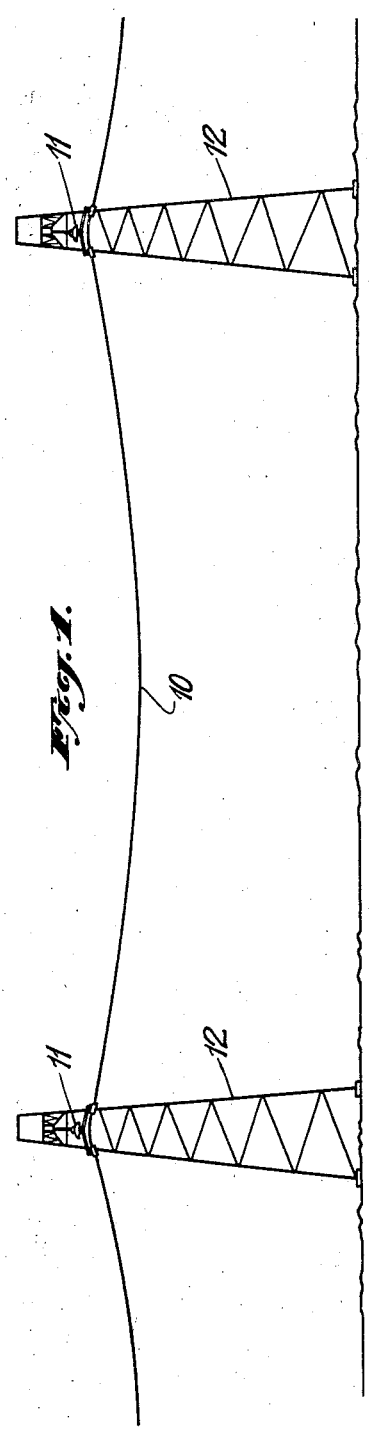
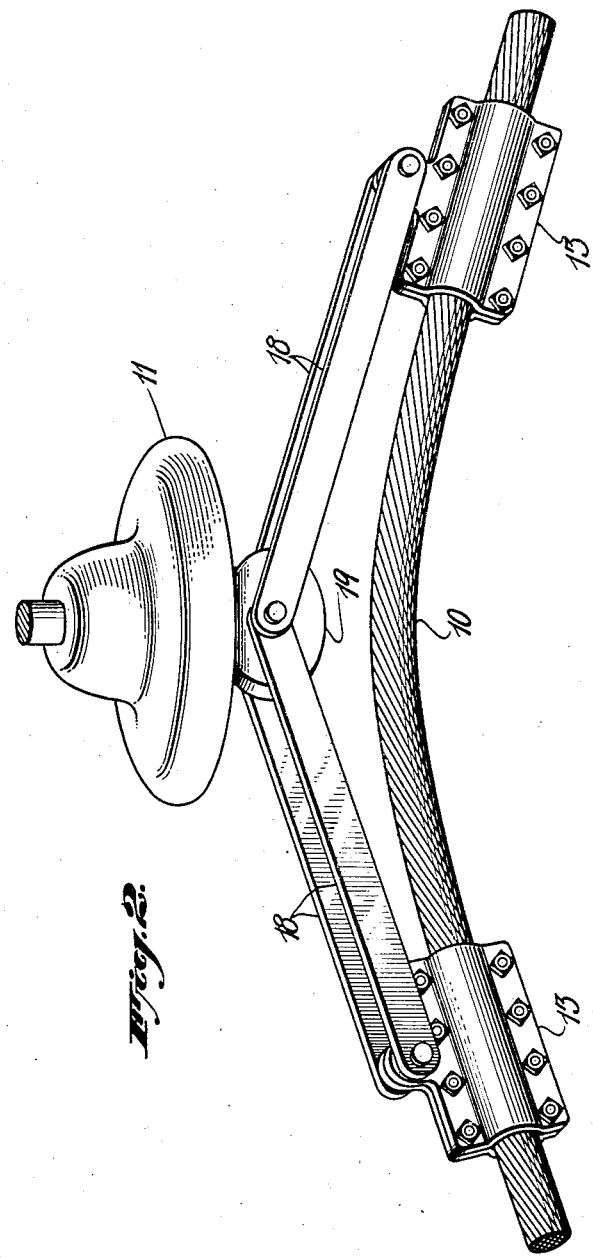
INVENTOR
JAMES E. TALBOTT.
BY Usina & Rauber
ATTORNEYS March 7, 1939. J. E. TALBOTT 2,149,875
CABLE SUPPORT
Filed Feb. 1, 1936 3 Sheets-Sheet 2
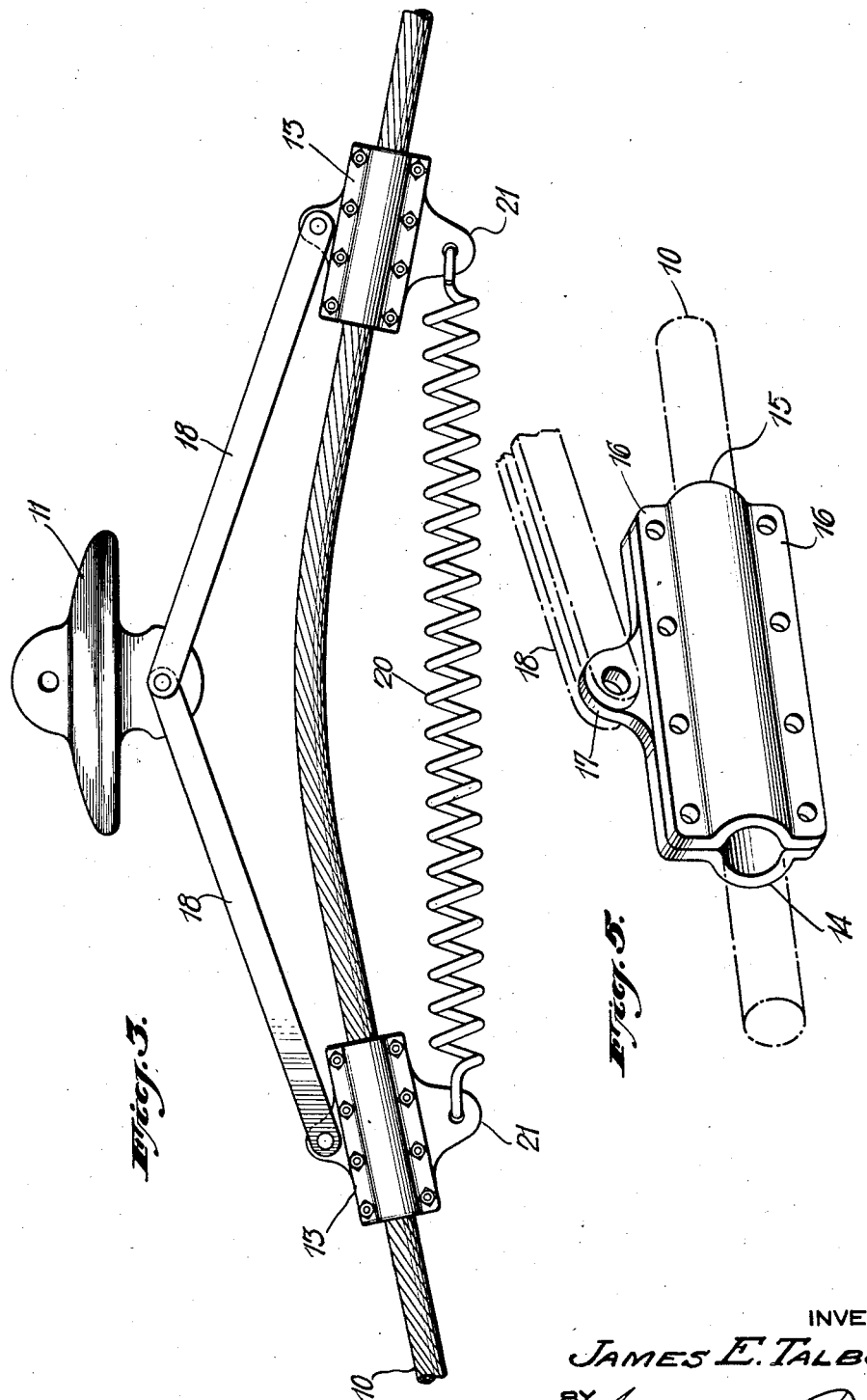
INVENTOR
JAMES E. TALBOTT
BY
ATTORNEYS

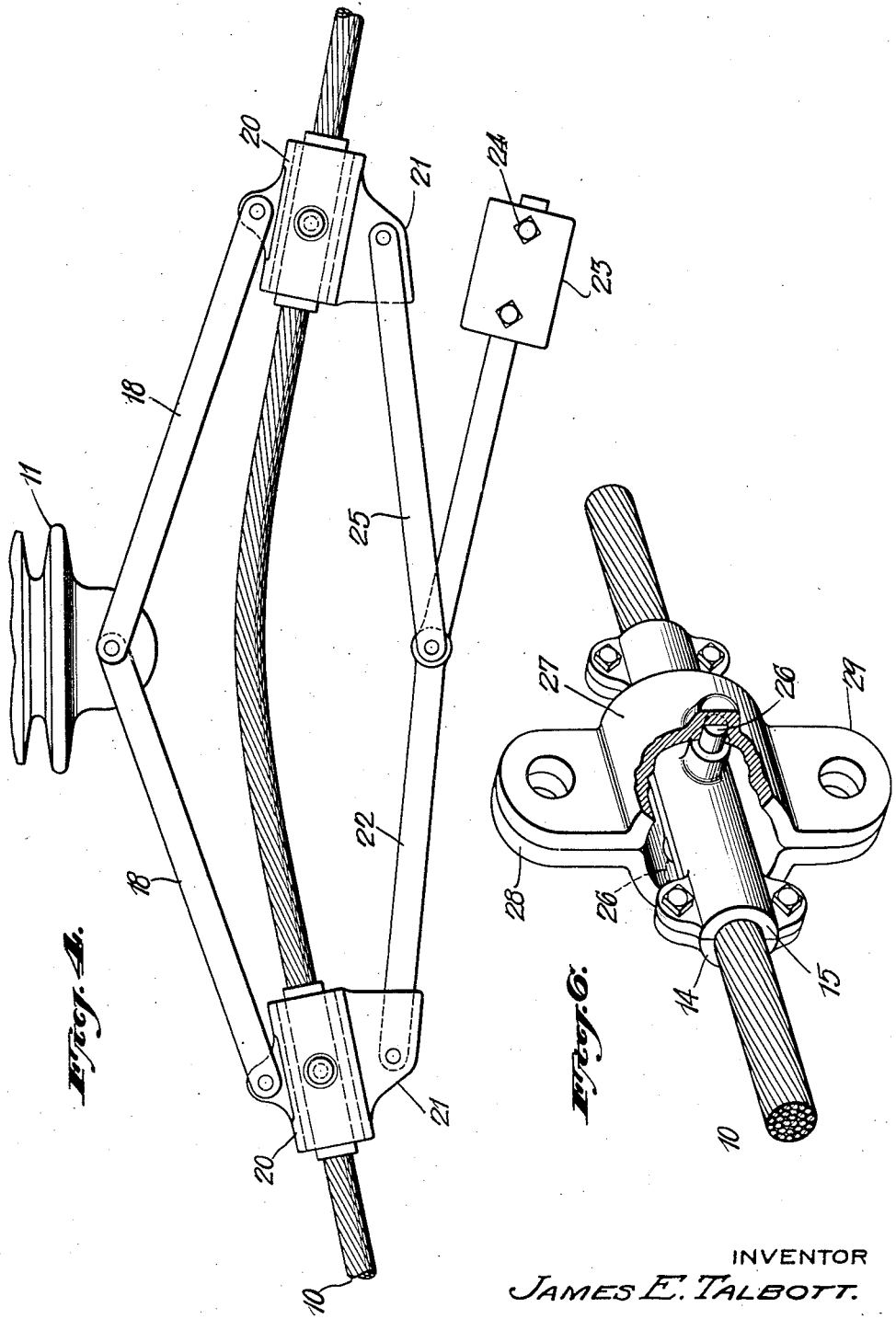

Patented Mar. 7, 1939

2,149,875

UNITED STATES PATENT OFFICE 2,149,875

CABLE SUPPORT

James E. Talbott, Dobbs Ferry, N. Y., assignor to Anaconda Wire & Cable Company, New York, N. Y., a corporation of Delaware Application February 1, 1936, Serial No. 61,927

4 Claims. (Cl. 248—63)

This invention relates to suspension means for electric cables, particularly those used for power lines operating at a high potential.

Overhead power conductors or cables are commonly supported at spaced intervals on high towers, and between these towers are caused by the effects of gravity and mechanical tension in the cable to take the form of depending catenary curves which will be of greater or lesser depth according to the mechanical tension on the cable and the weight of the cable. At the point where the cable is supported from the tower it extends on opposite sides of the support in downwardly inclined directions and, therefore, has a reverse curvature at the point of support. When the cable is supported at this point by resting on a supporting surface or saddle, a concentration of mechanical stresses takes place owing to the bending of the cable and the supporting of its weight and tension at a single point. Moreover, at this point of greatest mechanical stress the cable is nearest the grounded support and, therefore, there is the greatest danger of flash-over which is destructive to the cable, particularly when made of a number of strands.

These stresses are particularly troublesome in high voltage cables which are usually designed with a view to minimizing corona loss and reducing inductive effects. In these cables, therefore, the current density at the center of the conductor or cable is decreased by various methods of stranding as, for example, by employing a supporting core on which the main conducting strands are supported at a distance from the center of the cable and, in some cases, by constructing the cable without a core of any kind. Such a cable, in order to have sufficient flexibility, is made from a multiplicity of elements which must be maintained in proper relationship to secure satisfactory operation of the conductor. The concentration of the various forces in the outer strands of cable of this type render it particularly liable to failure at the point of support.

My present invention overcomes the above difficulties and provides a cable support in which the danger of failure at the point of support, due to the above causes, is greatly diminished or obviated.

The various features of the invention are illustrated in the accompanying drawings, in which—

Fig. 1 shows diagrammatically a length of cable and supporting means therefor embodying a preferred form of the invention.

Fig. 2 is a perspective view of the cable supporting means of Fig. 1.

Figs. 3 and 4 are side views of a cable support similar to that of Fig. 2, but provided with different tensioning means.

Fig. 5 is a perspective view of a clamping element of the suspension means, and

Fig. 6 is a view of another form of embodiment of clamping means.

In my invention the cable length approaching the supporting means of a tower is gripped and held by clamping means which takes the weight of the cable at approximately the end of the catenary curve and transfers it directly to the tower. The tension or weight of the cable is thus partially or entirely removed from the reversely curved length between two successive catenary curves. Stress is thus transferred directly to the clamping means and is partially or entirely removed from the cable at this point. The clamping means is between the cable and the supporting insulator from which it depends and thus any flash-over takes place, not from the cable to the grounded support, but from the clamping means which may be of solid metal resistant to the effects of flash-over. In this way the cable is protected from destruction by mechanical forces and also from the effects of flash-over. Moreover, the clamping means is given a hinged construction so that the swaying of the cable, due to the effect of wind, etc., is taken up in the clamping means which may also be arranged to effect a damping of the swaying motion of the cable.

Referring to the accompanying drawings, the invention is illustrated as applied to a cable 10 suspended between insulated supports 11 on towers 12. The ends of the lengths of cable on opposite sides of the supporting insulator 11 are gripped by means of clamps 13, one on each side of the insulator. These clamps are preferably made in two parts 14 and 15, as shown in Fig. 5, having diametrically projecting flanges 16 through which they may be bolted together to grip the cable. A lug or ear 17 is provided at one edge of the clamp through which it may be attached by means of connecting bars 18, one on each side of the lug, to a depending bracket 19 of the insulator 11. Thus the weight and mechanical tension of the cable is taken up by the clamps 13 and transferred directly to the insulator 11, leaving that part of the cable between the clamps free from tension or compression other than that involved in mere slight bending of the cable. It will be noted also, that the links or arms 18 are between the cable and the insulating support 11, and thus the shortest path for the electric flash-over current would be from the links 18 and not from the cable 10. These links or arms 18 are of solid metal and, therefore, less liable to burn than the small wires that form the stranded cable.

The mechanical tension or weight of the cable is transferred lengthwise through the upwardly inclined arms 18. The linkage arrangement between the cable and the supporting insulator enables the connecting links to take a position determined by the vertical and horizontal components of stresses between the cable and the supporting insulator. In case the cable is swayed by the wind, the links have a different period of oscillation and thus serve to break up or damp the swinging of the cable.

Under certain circumstances it may be desirable to decrease the angle between the links 18 on opposite sides of the insulator. This may be done by connecting a spring 20 under tension between lugs 21 on a pair of clamps 13, thereby tending to draw them closer together. By decreasing the angle between the links, the force required to set the arms in motion during vibration is decreased and the damping effect increased. This serves to decrease the bending between the clamps and the cable due to such vibration, and to lessen failures from this cause.

The angle between the links may also be reduced by the weighted arm and linkage shown in Fig. 4. In this embodiment an arm 22 is pivoted to one of the lugs 21 of a clamp and is provided at its free end with a weight 23 which may be moved along the arm 22 and secured in position thereon by means of a screw 24. Between the weight 23 and the lug 21 the arm 22 is connected by means of a connecting link 25 to the lug 21 of the opposite clamp 20. The weight 23 tends to swing the arm 22 and with it the arm 25 downwardly, bringing the clamps 20 closer together and decreasing the angle between the links 18. When a spring or counterweight is employed, as shown in Figs. 3 and 4, it is preferable to allow a play or adjustment between the clamping elements 13 and the lugs 17 and 21. For this purpose the embodiment shown in Fig. 6 may be employed. In this embodiment the two clamping elements 14 and 15 are provided with trunnions 26 projecting from opposite sides of the assembled clamping structure and received in sockets on the inner surfaces of a shackle 27 formed of two complementary parts having lugs 28 and 29 corresponding to the lugs 17 and 21. This type of clamp permits the shackle 27 to be held at an extreme angle by the spring 20 or weight 23, without deflecting or distorting the cable from the direction determined by the catenary curve.

Heretofore cables have usually been installed by suspension in sheaves or running blocks. The cable was then transferred to a device that straddled the sheaves and then to its final position. In the present invention the cable may be transferred directly from the running block to the clamping means in which it is to be suspended, and thus the suspension of the cable may be simplified, and the clamps applied on opposite sides of the sheaves. The clamps of the present invention may be readily removed and replaced, enabling the cable support to be employed as a repair fitting when the cable has been damaged at a single point of support.

What I claim is—

1. A cable support assembly for supporting a length of cable below and slightly spaced from a support, which comprises a pair of clamps for said cable spaced equally distant from the position of support and each having an ear projecting upwardly above said cable, a pair of links for securing said ears to the support, each link being pivotally connected to its respective ear and extending upwardly toward said support for pivotal connection thereto, each clamp having a pair of ears projecting below said cable, a second pair of links pivoted to each other midway of said clamps and pivotally secured at their free ends to the downwardly projecting ears on said clamps, and a weight on said linkage to draw said clamps toward each other.

2. A cable support assembly for supporting a length of cable below and slightly spaced from a support, comprising a pair of clamps for said cable spaced at approximately equal distances from the position of said support, each of said clamps having an ear extending above said cable and an ear projecting below said cable, links pivoted to said upper ears and extending to said support for pivotal connection thereto to connect and support said ears from said support, and means tending to pull said lower ears towards each other resiliently.

3. A cable support assembly for supporting a length of cable below and slightly spaced from a support, comprising a pair of clamps for said cable spaced equally from the position of said support, said clamps each comprising a shackle and an enclosing housing, said shackle being pivoted to said housing on approximately a horizontal line passing through said cable, each said housing having a pair of ears, one projecting upwardly and the other downwardly, links pivotally connected to said upwardly projecting ears and extending to said support to connect said ears thereto, and means connected to the downwardly projecting ears to draw said ears towards each other.

4. The assembly of claim 3 in which said means comprise a weighted lever arm pivotally connected to one of said downwardly projecting ears, and a link pivotally connected to said lever and to the downwardly projecting ear of the other clamp.

JAMES E. TALBOTT.